United States Patent [19]

Appleford et al.

[11] Patent Number: 5,433,411
[45] Date of Patent: Jul. 18, 1995

[54] CONNECTOR FOR INTERCONNECTING CONDUITS

[75] Inventors: David E. Appleford, Theydon Bois, United Kingdom; James Neighbour, London, England

[73] Assignee: Alpha Thames Engineering Ltd., London, England

[21] Appl. No.: 955,904

[22] PCT Filed: Jun. 14, 1991

[86] PCT No.: PCT/GB91/00967
§ 371 Date: Oct. 4, 1993
§ 102(e) Date: Oct. 4, 1993

[87] PCT Pub. No.: WO91/19927
PCT Pub. Date: Dec. 26, 1991

[30] Foreign Application Priority Data

Jun. 15, 1990 [GB] United Kingdom ................ 9013439

[51] Int. Cl.⁶ ..................... F16K 51/00; F16L 21/06
[52] U.S. Cl. ................................. 251/148; 285/31
[58] Field of Search ............... 251/148; 285/31, 32

[56] References Cited

U.S. PATENT DOCUMENTS

| 1,627,044 | 5/1927 | McGeehin | 285/31 |
| 1,960,568 | 5/1934 | Abrams | 285/31 X |
| 3,182,682 | 5/1965 | Gilliam | 285/31 X |

FOREIGN PATENT DOCUMENTS

260237A1  3/1988  European Pat. Off. .
158535   11/1985  United Kingdom .
197407    5/1988  United Kingdom .

Primary Examiner—Martin P. Schwadron
Assistant Examiner—Kevin L. Lee
Attorney, Agent, or Firm—Biebel & French

[57] ABSTRACT

A connector for interconnecting two open-ended, generally aligned conduits comprises a sealing unit movably connected to a toggle mechanism. The connector is lowered by a simple tool between the conduit ends until yokes of the toggle mechanism move inwardly to engage the flanges of the conduit ends to align further the conduits. Clamps interconnected by tension rods pivot downwardly to clamp the conduit ends against the sealing unit. Tubular seals within the sealing unit are then moved outwardly to engage with the conduit ends by further toggle arrangements actuated by downward movement of a bar.

10 Claims, 9 Drawing Sheets

VALVE INSTALLED    VALVE LOCATED

CONNECTOR FOR INTERCONNECTING CONDUITS

BACKGROUND OF THE INVENTION

The present invention relates to connectors for interconnecting conduits and in particular, though not exclusively, to connectors for interconnecting conduits, such as pipe for carrying for example oil and/or gas, in subsea locations involving the connection of conduits at a subsea installation.

In one such situation, it is necessary to connect conduits located at the subsea installation to conduits which extend above sea level in order to provide a flow line from the installation. A sea-going vessel tows the open end of a conduit extending to above sea level into the vicinity of the open end of another conduit extending from the subsea installation. The two conduit ends are then roughly aligned and interconnected by a suitable connector in a sealing manner.

One known type of connector for interconnecting the conduit ends consists of an annular seal and clamp which are carried by an installation tool to the generally aligned conduit ends. The installation tool is then required, in successive operations: to engage with each conduit and align the conduit ends; to lower the seal between the conduit ends; to move one or both conduit ends towards the seal; to actuate the clamp to effect clamping of the two conduit ends against the seal; and then to disengage from the conduits for retrieval of the installation tool. Thus, in order to complete the interconnection of the conduit ends, five successive operations have to be carried out and the installation tool is required to perform three main tasks which necessitates the use of highly complex and expensive machinery to achieve the task manoeuvres. Furthermore, because the operations are carried out successively the whole installation procedure takes some time to complete, thereby further adding to the cost.

In another known type of connector, a telescopic sealing unit containing tubular seals slidable by a worm and wheel mechanism, is lowered by an installation tool between the generally aligned conduit ends with the unit also engaging around the conduit ends. Precise alignment of the conduit ends is achieved by friction clamping. The installation tool is then required to actuate the worm and wheel mechanism to slide the seals outwardly into sealing engagement with the conduit ends. The tool is then retrieved. Thus, although this procedure is less complex than the aforementioned procedure, there are still three successive operations to be carried out and the installation tool is still required to perform one main task, namely actuation of the worm and wheel mechanism. Furthermore, large locking forces are experienced by the seals themselves, which creates the possibility of damage.

SUMMARY OF THE INVENTION

It is therefore an object of the present invention to provide a connector for interconnecting conduits which is capable of being installed by a much simpler and quicker procedure than has been achieved heretofore and without the use of a complex and costly installation tool.

According to the present invention, there is provided a connector for interconnecting two generally aligned open-ended conduits, the connector comprising means for providing a seal between the conduits ends, and being characterized in that it includes a toggle mechanism, connected to the sealing means, for moving the conduit ends further into alignment with each other and for clamping them against the sealing means located therebetween.

The toggle mechanism preferably comprises means for engaging with flanges provided on the conduit ends and clamping means movably connected to the flange engaging means by toggle arrangements, such that actuation of the toggle arrangements moves the engaging means into engagement with the flanges and causes the clamping means to clamp the conduit ends against the sealing means. The flange engaging means are preferably slidably connected to the sealing means.

In one embodiment, the clamping means comprises two clamping members interconnected by tension rods, and the flange engaging means comprises two yokes located between the clamping members and each movably connected to a respective one of the clamping members by a separate toggle arrangement. Each toggle arrangement preferably comprises at least one lever pivotally connected at its ends to the yoke and to the clamping member, respectively.

The sealing means preferably comprises a housing having a generally cylindrical chamber extending therethrough and containing at least two tubular seals, and a further mechanism operable from outside of the housing for moving the seals into sealing engagement with the two conduit ends when the sealing means is located therebetween. In a preferred embodiment, the seal moving mechanism comprises at least one further toggle arrangement located on the outside of said housing. The seals may be connected to carriers located within the housing and slidable relative to the housing by operation of the seal moving mechanism. Each further toggle arrangement may consist of two levers pivotally interconnected at their adjacent ends and pivotally connected at their other ends respectively to connecting members extending through apertures in said housing wall and being connected to the seal carriers.

In alternative embodiments, the sealing means may comprise a valve arrangement, such as an emergency shutdown valve, or other pipe-line equipment.

BRIEF DESCRIPTION OF THE DRAWINGS

The invention will now be further described by way of example with reference to the accompanying drawings, in which.

DESCRIPTION OF THE PREFERRED EMBODIMENTS

Referring now to FIGS. 1 to 8 of the drawings, a connector shown generally at 1 is used to interconnect two conduits 2,3, one of which is connected, for example, to a subsea pipe installation (not shown) and the other of which extends, for example, above sea level. Open ends 4,5 of the conduits each have outer surfaces 6,7, which taper outwardly towards the open ends and which terminate in an outwardly-extending flange 8,9 extending around the periphery of the conduit end. End faces 10,11 of the conduits are each formed with an annular groove 12,13 and narrow annular recesses 14,15 are formed around the internal peripheries of the conduit ends.

The connector 1 comprises a sealing unit 16 movably connected to a toggle mechanism 17. The toggle mechanism includes two clamps 18,19 interconnected by six tension rods 20. Yokes 21,22 having recesses 21a, 22a respectively are located between the clamps and are connected to a respective one of the clamps by two toggle arrangements. Each toggle arrangement consists of four levers 23 each pivotally connected at one end to one of the clamps an pivot points 24 and at their other end to one of the yokes at pivot points 25. Each yoke 21,22 is slidably connected to the sealing unit 16 by two interconnecting members 26 which slide in grooves 27 provided in the outer surface of housing 28 of the sealing unit 16.

Figure 7:
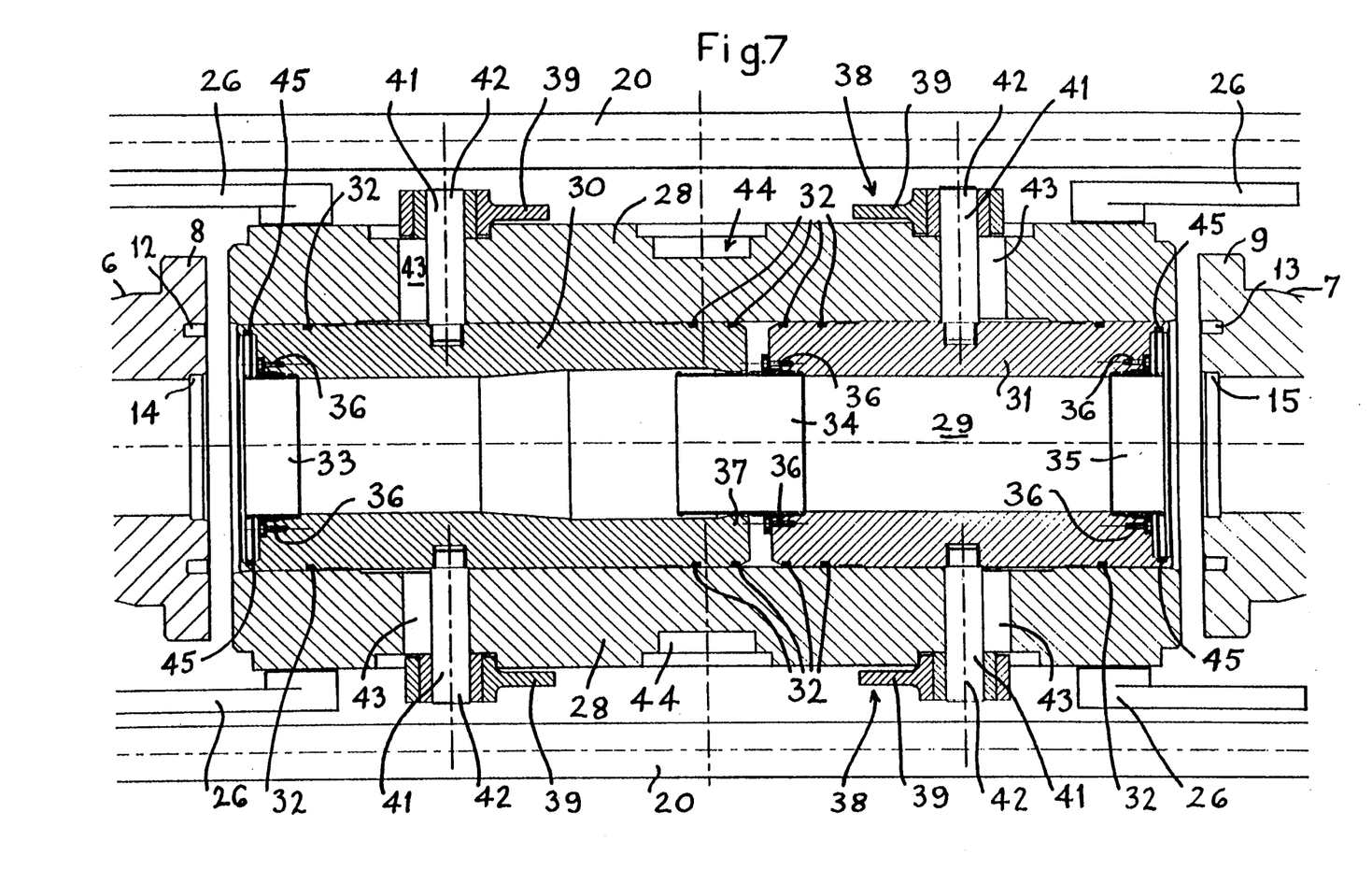
FIG. 7 shows an enlarged horizontal sectional view of the sealing unit of the connector in an "open" position.
Figure 8:
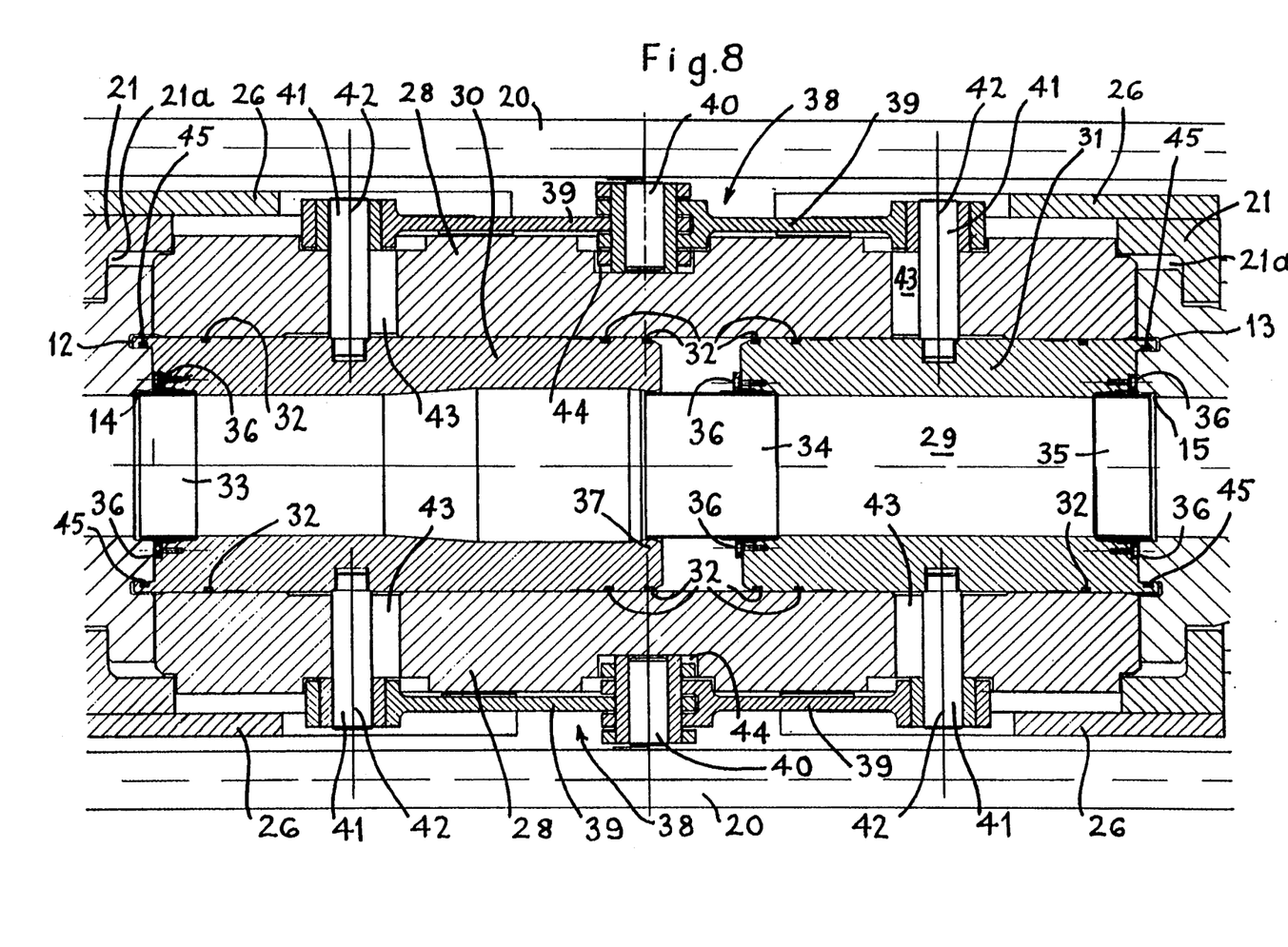
FIG. 8 shows an enlarged horizontal sectional view of the sealing unit of the connector in a "closed" position.

The housing of the sealing unit, which is shown in detail in FIGS. 7 and 8, has a cylindrical chamber 29 extending throughout its length containing two tubular seal carriers 30,31, in sealing engagement with the inner surface of the chamber 29 by means of a series of small annular sealing rings 32, and three tubular seals 33,34,35. By means of fixings 36, the seal 33 is fixedly connected to the seal carrier 30 and the seals 34 and 35 are fixedly connected to the seal carrier 31. Additionally, inner end 37 of the seal carrier 30 sealingly and slidably engages with the outer surface of the tubular seal 34. The outer end faces of the seal carriers 30,31 are formed with peripheral outwardly-extending flanges 45 and the seals 33 and 35 protrude slightly beyond the end faces of the seal carriers 30 and 31, respectively.

Figure 1:
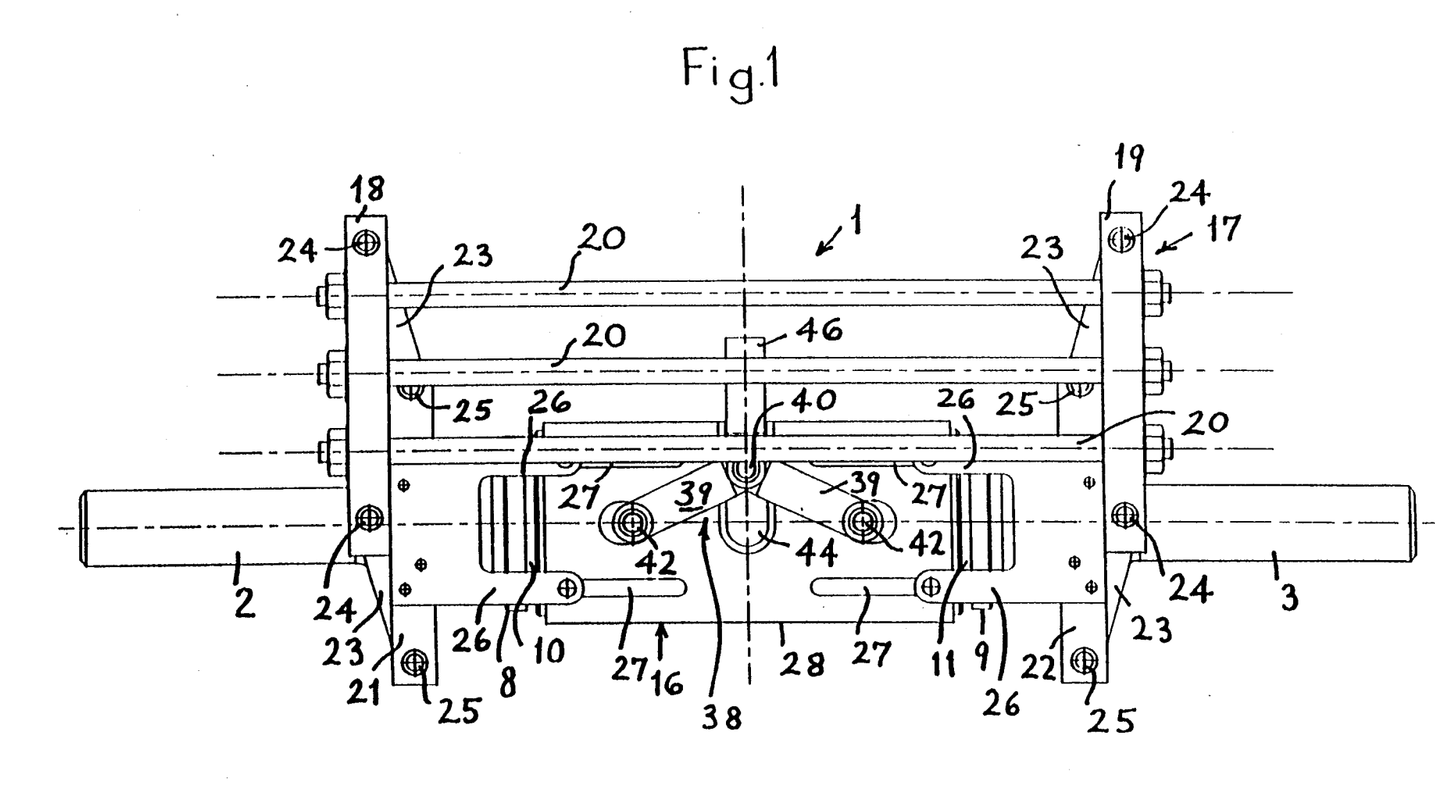
FIG. 1 shows a side View of a connector, in accordance with one embodiment of the invention, with the connector shown in an "open" position.
Figure 2:
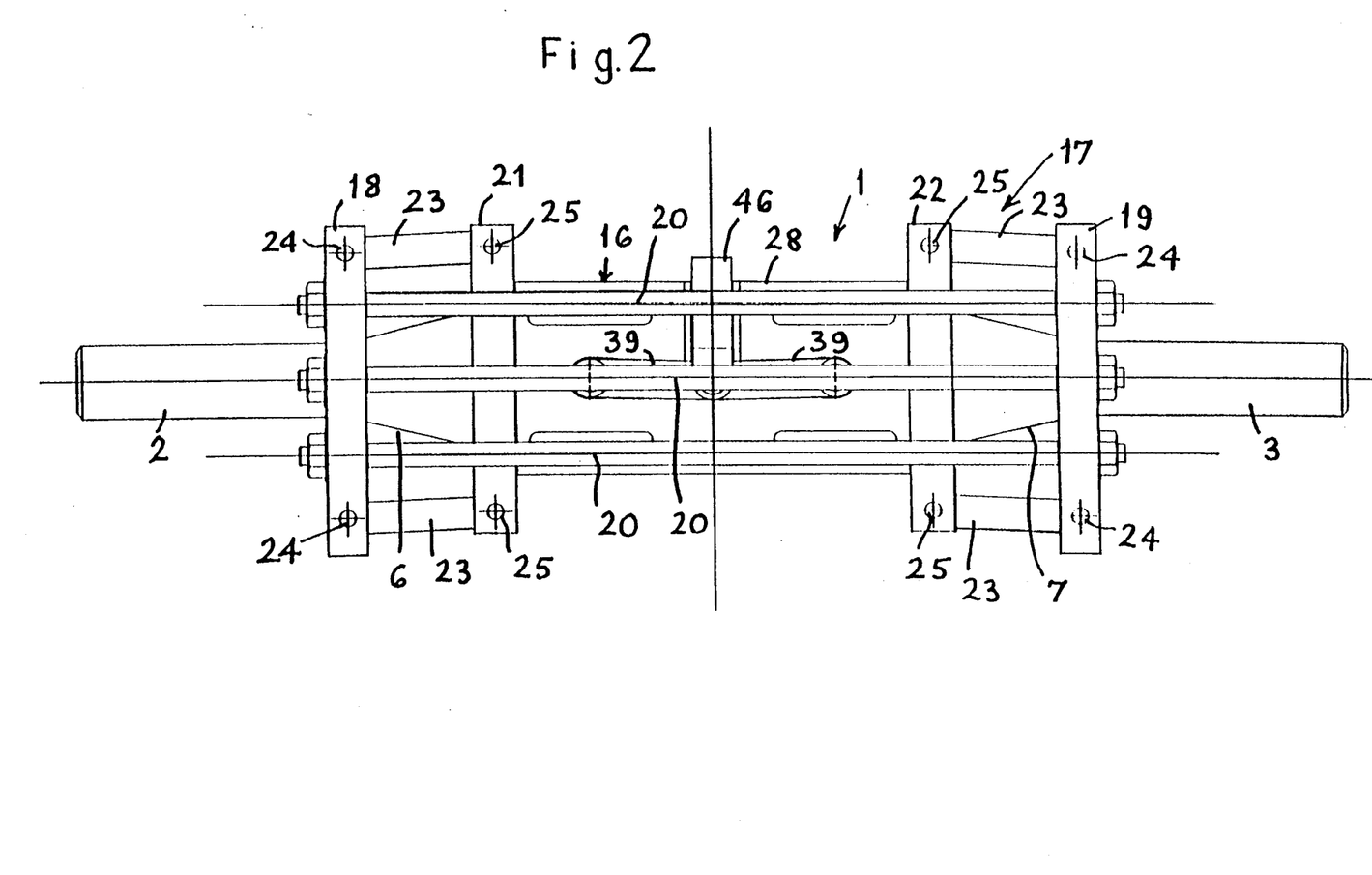
FIG. 2 shows the same view as in FIG. 1, but with the connector in a "closed" position.
Figure 3:
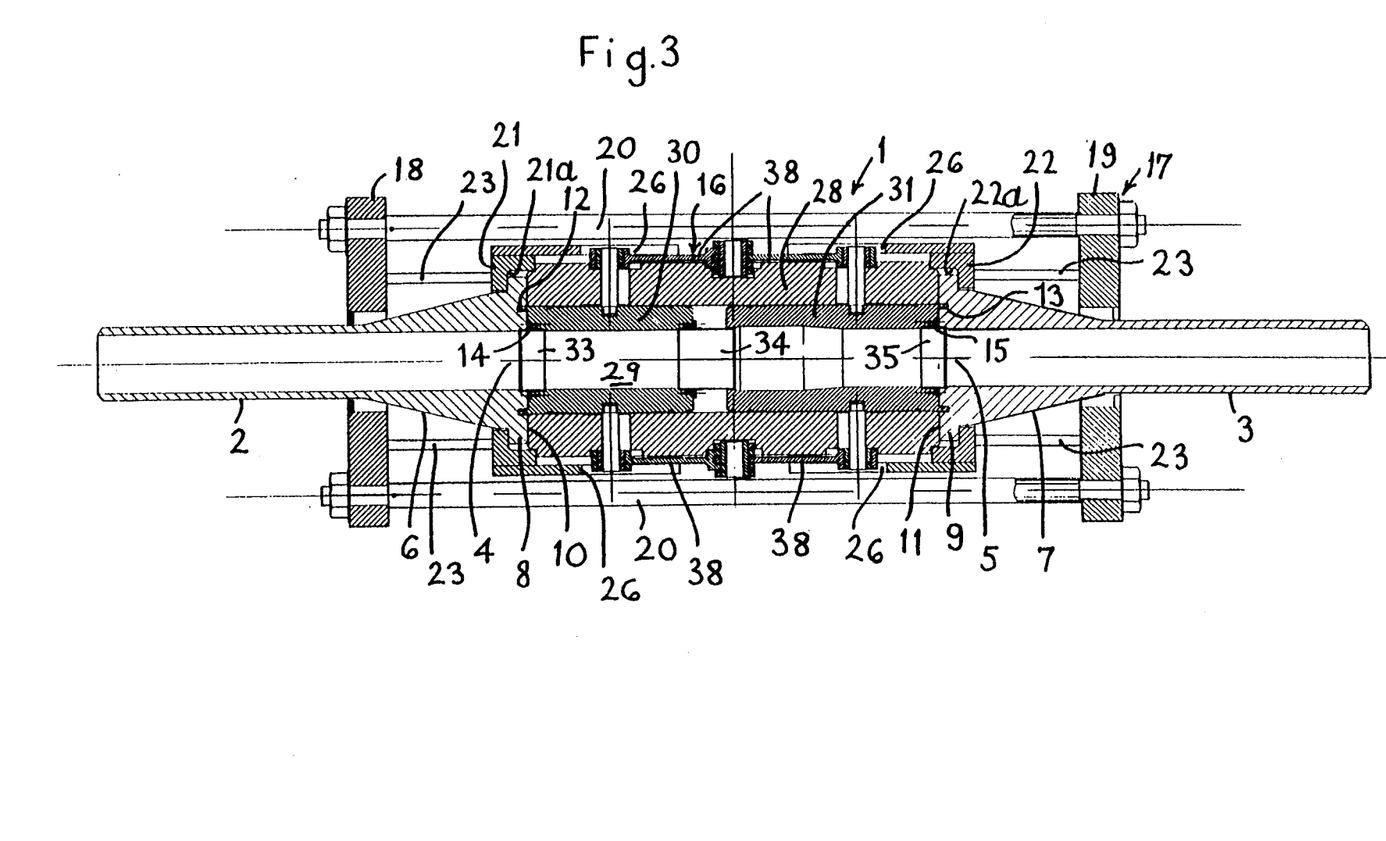
FIG. 3 shows a horizontal sectional view of the connector in a "closed" position.
Figure 4:
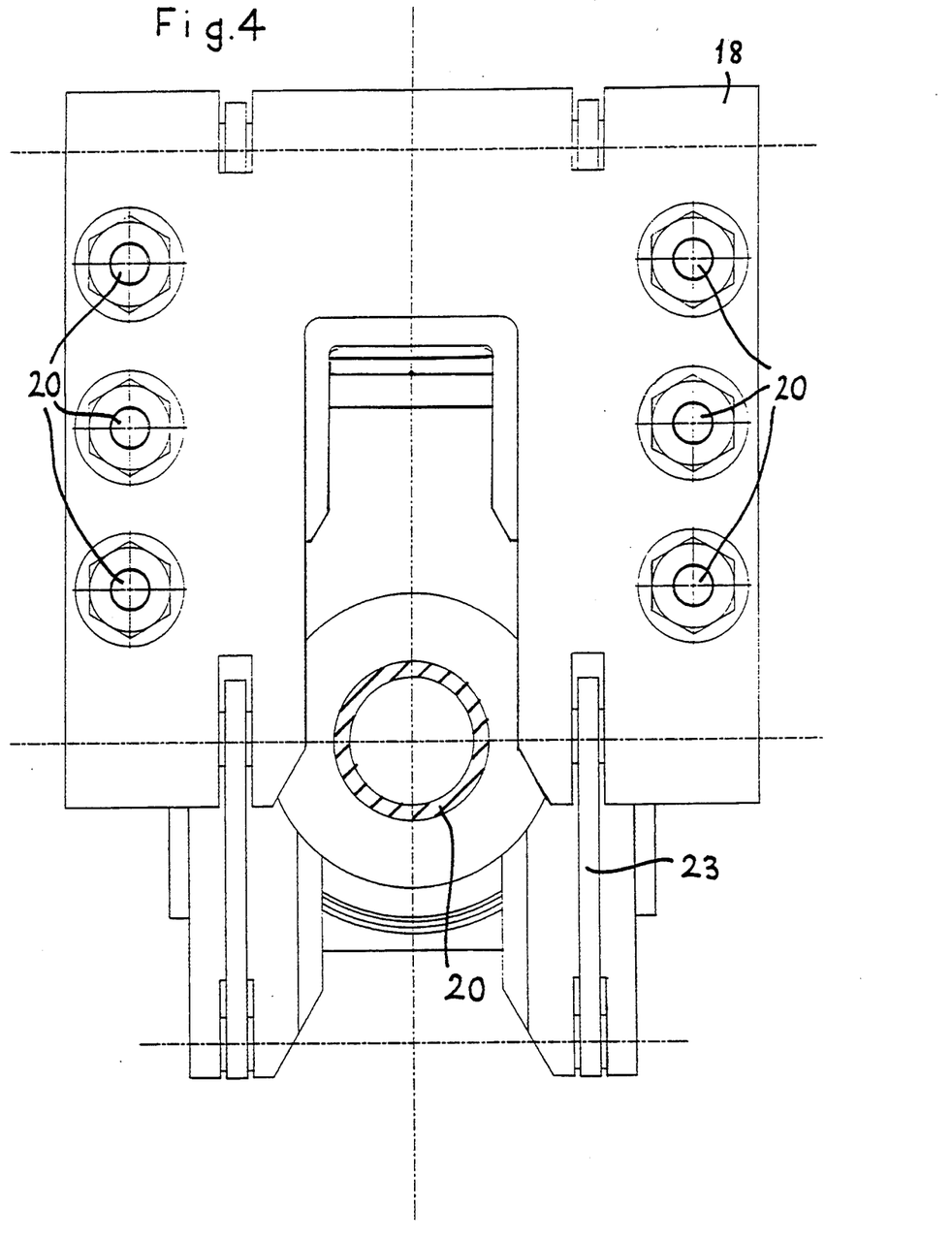
FIG. 4 shows an end view of the connector in an "open" position.
Figure 5:
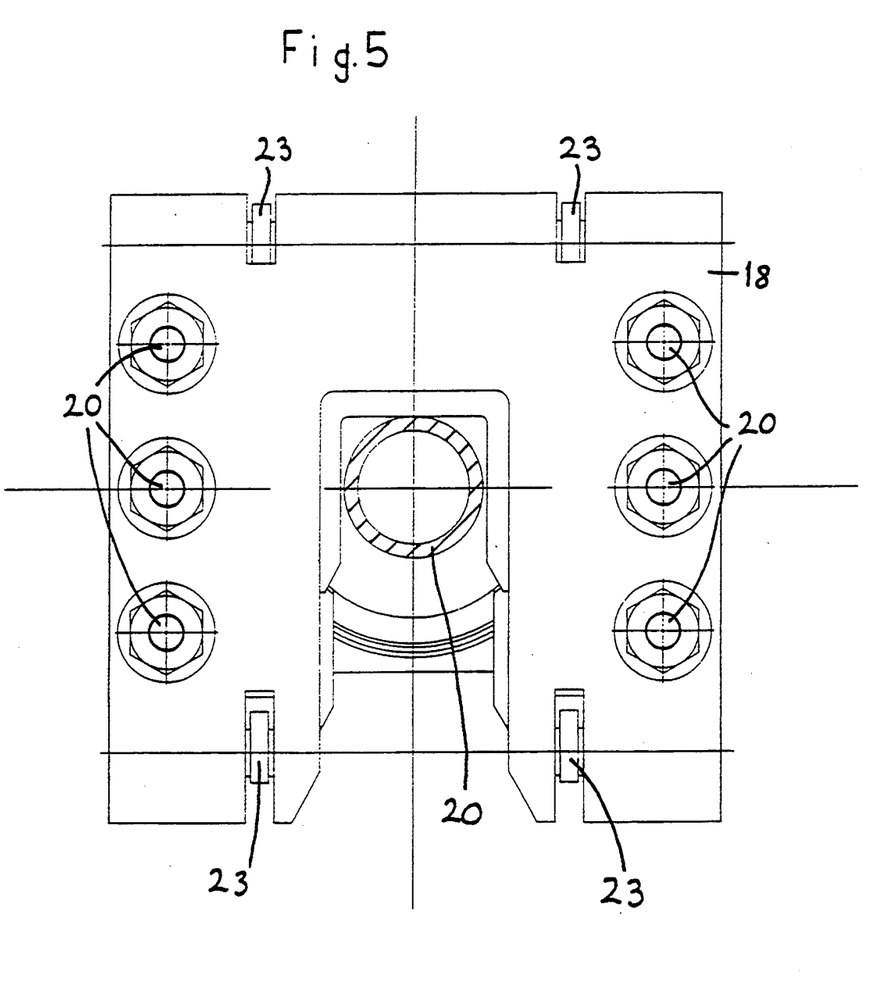
FIG. 5 shows an end view of the connector in a "closed" position.
Figure 6:
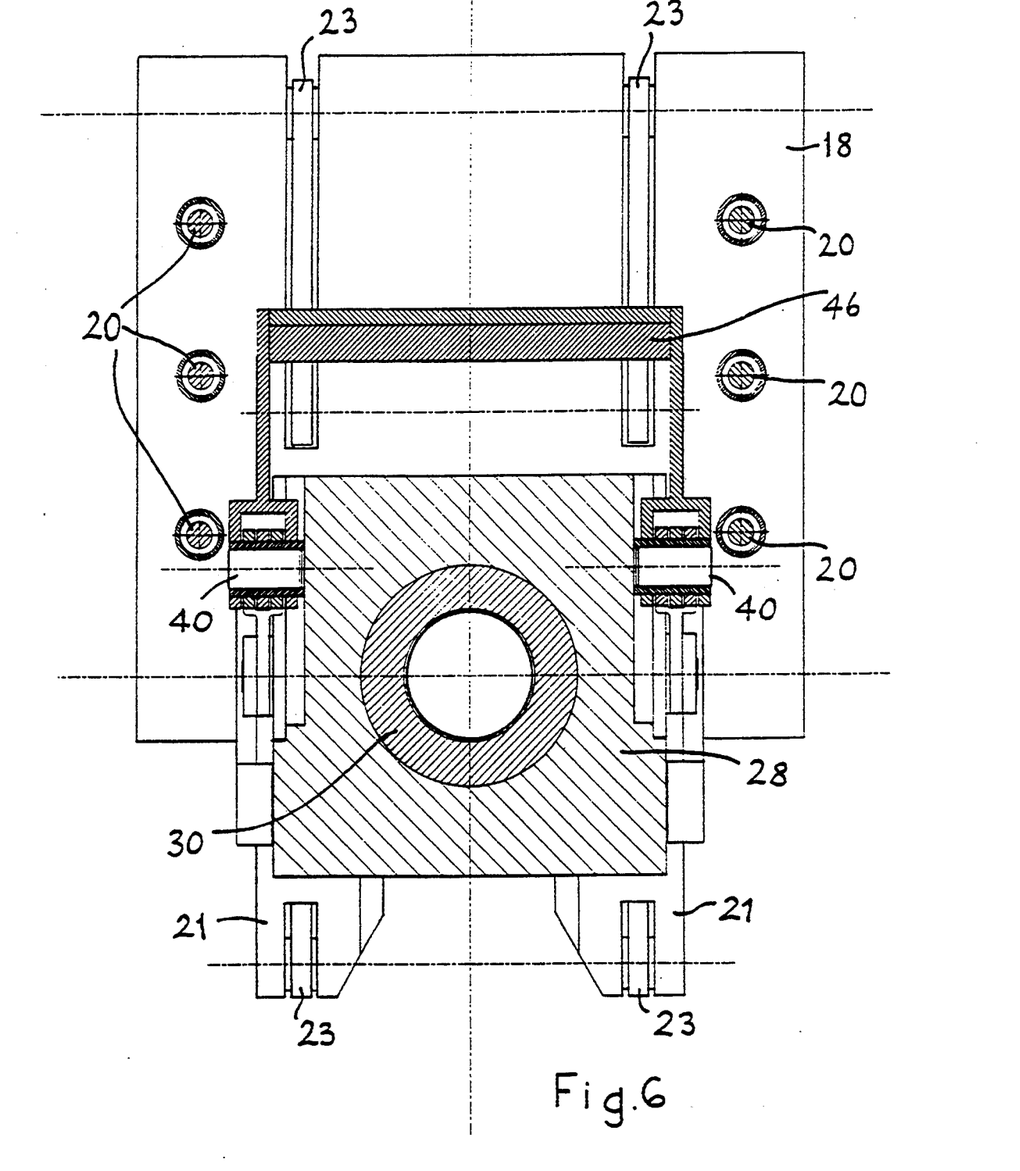
FIG. 6 shows a vertical sectional view of the connector in an "open" position.

Two toggle arrangements 38 are mounted on the external sides of the housing 28. Each toggle arrangement consists of two levers 39 pivotally interconnected at their adjacent ends at a central pivot 40 and at their outer ends to two connecting members 41 respectively at pivot points 42. The two connecting members 41 extend through apertures 43 in the housing side wall and one is connected into seal carrier 30 and the other into seal carrier 31. Grooves 44 are formed in the external side walls of the housing 28 to accommodate the pivots 40, which are interconnected by a bar 46, as shown in FIGS. 1, 2 and 6.

In order to install the connector, any suitable apparatus is first used in order to position and retain the conduits ends, which may be in a subsea location, in general concentric alignment with each other. The connector to interconnect the conduit ends is then lowered by means of a simple tool so that the sealing unit is positioned between the conduit ends and the yokes 21,22 are positioned over the conduits, as shown in FIG. 1. Further simultaneous lowering of the clamps 18,19 causes the levers 23 to pivot about pivot points 24 and 25 on the clamps 18,19 and the yokes 21,22, respectively. This pivoting action causes the yokes 21,22 to slide along the tapered outer surfaces 6,7 of the conduit ends until recesses 21a,22a engage around the flanges 8,9 of the conduit ends, thereby moving the conduit ends towards each other and into precise concentric alignment with each other. At the same time, connecting members 26 secured to the yokes 21,22 slide inwardly in the grooves 27. As the lowering of the clamps 18,19 continues, an over-centring of the pivot points 24 and 25 occurs, so that pivot points 24 are positioned slightly below pivot points 25, as shown in the "connector closed" position in FIG. 2. This over-centring action locks the clamps 18,19 into a position which effects a clamping action on the yokes 21,22, thereby causing the conduit ends to be clamped against the sealing unit 16 located therebetween.

Lowering of the bar 46 pushes the pivot points 40 on the sealing unit downwards, so that the levers 39 move outwardly, pivoting about pivot points 42. This moves the connecting members 41 within the apertures 43 from the inner position shown in FIG. 7 to the outer position shown in FIG. 8. This movement causes the seal carriers 30 and 31 to slide outwardly simultaneously in opposite directions with the inner end 37 of seal carrier 30 sliding relative to the seal 34. The outer end faces of seal carriers 30 and 31 engage with the conduit end faces, with the seal carrier flanges 45 engaging into the annular grooves 12,13 and the protruding portions of seals 33 and 35 engaging into the annular recesses 14 and 15, respectively. The seals are finally locked into their sealing positions with the conduit ends by over-centring of the pivot points 40 and 42 such that the pivot point 40 is positioned slightly below the pivot points 42.

In order to retrieve the connector, a simple tool is connected thereto which merely raises the bar 46, thereby releasing the toggle arrangements on the sealing unit 16 to withdraw the seals from the conduit ends and subsequently lift the toggle mechanism 17 to unlock the clamps and withdraw the yokes from the conduit ends.

It can thus be seen that the connector, in accordance with the described embodiment of the present invention, enables the conduits to be installed and retrieved very simply and quickly, without the need for a complex and costly installation tool. All the tool is required to do is lower and raise the clamps 18,19 and the bar 46, the aligning, clamping and sealing actions all being carried out by the connector itself.

Whilst one particular embodiment of the present invention has been described, various modifications will be envisaged without departure from the scope of the invention, as defined in the appended claims. For example, the connector may be used to individually interconnect a plurality of parallel conduits contained in a bundle within a main outer conduit. In this embodiment, the sealing unit may contain further tubular seals of smaller diameter within the seals as shown, in order to provide the individual sealings of the interconnected conduits of the bundle.

Additionally, although the connector shown in the Figures has six tension rods, any even number of these rods may be used depending on the size of the connector.

Moreover, instead of using the sealing unit as shown in FIGS. 1 to 8, other sealing means between the conduit ends may be used. For example, a valve arrangement, such as an emergency shut-down valve, or other pipeline equipment, can be utilised.

Figure 9:
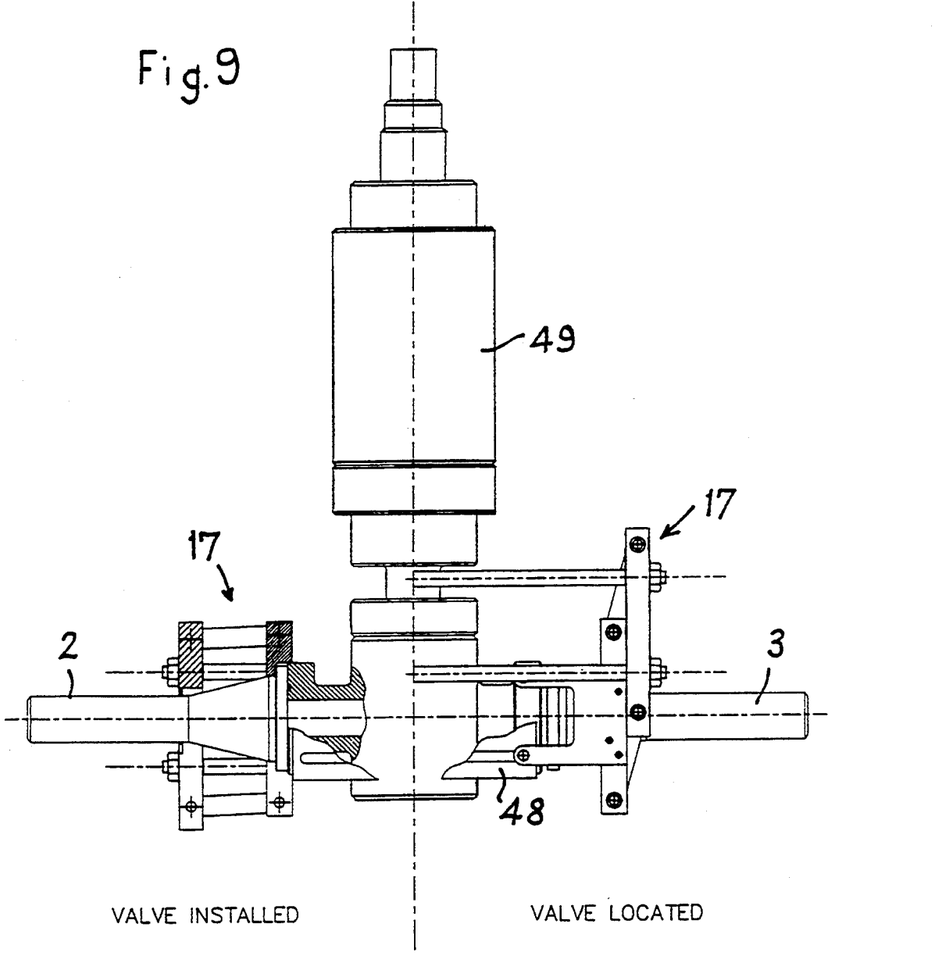
FIG. 9 shows a schematic horizontal sectional view of another embodiment of the invention.

In one alternative embodiment shown schematically in FIG. 9, the sealing means 48 located between the conduit ends comprises a valve arrangement 49. The right-hand side of this Figure shows the valve arrangement located between the conduits with the toggle mechanism 17 in an "open" position and the left-hand side of the Figure shows the valve arrangement installed and sealed against the conduit ends with the toggle mechanism 17 in a "closed" position.

The connector in accordance with the present invention may be used for interconnecting conduits in different applications such as flow-line connections as well as pipe-line repairs.

We claim:

1. A connector for interconnecting two generally aligned conduits having open ends provided with flanges, said connector comprising:

a toggle mechanism for moving the conduit ends into precise concentric alignment with each other, said toggle mechanism including a plurality of toggle arrangements for effecting an over-centering action, flange engaging means adapted to engage with said flanges, and clamping means pivotally connected to said flange engaging means by said toggle arrangements; and a sealing unit for sealing between said aligned conduit ends so as to permit fluid flow through said conduits, said sealing unit being adapted to be removably located between said conduit ends and said toggle mechanism being movably mounted on said sealing unit, whereby actuation of said toggle mechanisms when said sealing unit is located between said conduit ends moves the flange engaging means into engagement with said flanges to align precisely said conduit ends and causes the clamping means to clamp said conduit ends against the sealing unit by said over-centering action of said toggle arrangements.

2. A connector as claimed in claim 1, wherein the flange engaging means are slidably connected to the sealing unit.

3. A connector as claimed in claim 1, wherein the clamping means comprises a plurality of tension rods and two clamping members interconnected by said tension rods, and the flange engaging means comprises two yokes located between the clamping members and each movably connected to a respective one of the clamping members by a separate one of said toggle arrangements.

4. A connector as claimed in claim 3, wherein each toggle arrangement comprises at least one lever having two ends, said lever being pivotally connected at said ends to one of the yokes and to one of the clamping members respectively.

5. A connector as claimed in claim 1, wherein the sealing unit comprises a housing having a generally cylindrical chamber extending therethrough and containing at least two seals.

6. A connector as claimed in claim 1, wherein the sealing unit contains seals and the connector also includes a seal moving mechanism operable from outside of the sealing unit for moving said seals into sealing engagement with the conduit ends when the sealing unit is located therebetween.

7. A connector as claimed in claim 6, wherein the seal moving mechanism comprises at least one further toggle arrangement located on the outside of said sealing unit.

8. A connector as claimed in claim 6, wherein the sealing unit also contains carriers, the seals being connected to said carriers and slidable relative to the sealing unit by operation of the seal moving mechanism.

9. A connector as claimed in claim 8, wherein said sealing unit has a wall provided with apertures and connecting members extending through said apertures and connected to said seal carriers, and each further toggle arrangement consists of two levers each having first and second ends, the first ends being pivotally interconnected and the second ends being respectively connected to said connecting members extending through said apertures.

10. A connector as claimed in claim 1, wherein the sealing unit comprises a valve arrangement to be sealingly located between the conduit ends.

* * * * *